United States Patent [19]

Brixel et al.

[11] Patent Number: 5,031,522
[45] Date of Patent: Jul. 16, 1991

[54] APPARATUS FOR THE RECOVERY OF FOOD JUICES

[75] Inventors: Berthold Brixel, Teisnach, Fed. Rep. of Germany; Giorgio Bini, I-41014 Castelfranco, Emilia, Italy

[73] Assignees: Krauss Maffei Aktiengesellschaft, Munich, Fed. Rep. of Germany; Giorgio Bini, Castelfranco, Italy

[21] Appl. No.: 356,995

[22] Filed: May 24, 1989

[30] Foreign Application Priority Data

May 25, 1988 [DE] Fed. Rep. of Germany ....... 3817689

[51] Int. Cl.$^5$ .............................................. A23N 1/00
[52] U.S. Cl. ......................................... 99/511; 99/513; 99/516; 210/360.1; 210/369; 494/36; 494/66
[58] Field of Search ................. 99/513, 512, 511, 510, 99/509, 495, 516, 484; 494/43, 66, 67, 36; 210/211, 360.1, 369, 378, 379

[56] References Cited

U.S. PATENT DOCUMENTS

| | | | |
|---|---|---|---|
| 966,573 | 8/1910 | Mitchell | 210/369 |
| 1,067,766 | 7/1913 | Sievers et al. | 494/66 |
| 1,283,846 | 11/1918 | Mark et al. | 494/66 |
| 1,954,676 | 4/1934 | Lindberg | 210/369 |
| 2,190,072 | 2/1940 | Keys | 210/364 |
| 2,255,764 | 9/1941 | Drachenberg | 99/511 |
| 2,301,901 | 11/1942 | McKinnis | 210/211 |
| 2,311,379 | 2/1943 | Gillanders | 99/512 |
| 2,481,010 | 9/1949 | Gundelfinger | 99/512 |
| 2,527,695 | 10/1950 | Bennett | 99/511 |
| 2,646,921 | 7/1953 | Adams et al. | 494/66 |
| 2,696,440 | 12/1954 | Ball | 426/599 |
| 2,750,040 | 6/1956 | Strich | 210/371 |
| 2,823,126 | 2/1958 | Little | 426/422 |
| 3,327,401 | 6/1967 | Stamos et al. | 210/369 |
| 3,346,392 | 10/1967 | Lowe et al. | 426/481 |
| 4,052,304 | 10/1977 | Vertenstein | 210/360.1 |
| 4,557,831 | 12/1985 | Lindsay et al. | 210/360.1 |
| 4,681,031 | 7/1987 | Austad | 99/513 |

FOREIGN PATENT DOCUMENTS

| | | |
|---|---|---|
| 736499 | 6/1943 | Fed. Rep. of Germany . |
| 1731472 | 8/1956 | Fed. Rep. of Germany . |
| 6602590 | 6/1964 | Fed. Rep. of Germany . |
| 119523 | 5/1976 | Fed. Rep. of Germany . |
| 2750787 | 7/1982 | Fed. Rep. of Germany . |
| 215474 | 5/1983 | Fed. Rep. of Germany . |
| 3008132 | 8/1983 | Fed. Rep. of Germany . |
| 3517886 | 2/1986 | Fed. Rep. of Germany . |
| 830547 | 5/1938 | France . |
| 1200931 | 7/1959 | France ................. 99/511 |
| 1474989 | 3/1967 | France . |
| 412225 | 11/1966 | Switzerland ........... 99/511 |
| 1165319 | 9/1969 | United Kingdom . |

OTHER PUBLICATIONS

Germany, Entsaftung—pp. 149, 150, 151, date unknown.
Food Technology, Jul. 1975—pp. 32-37 (Extraction of Apple Juice With a Solid Bowl Decanter Centrifuge).

*Primary Examiner*—Timothy F. Simone
*Attorney, Agent, or Firm*—Herbert Dubno

[57] ABSTRACT

The process for obtaining juice, especially apple juice, from a mash obtained by crushing cells is free of enzymatic or biochemical processing steps for removal of pectins and performs the juice extraction continuously. The fluid phase obtained from the mash in a continuous centrifugation process and the foam combined with pectin components floating on it are separated from each other, advantageously by a vibrating screen. This process and eventual subsequent downstream separation steps, including for example removal of residual cellulose fibrous fractions from the fluid phase by centrifugal decantation, must be completed before the reaction of pectin with oxygen begins. An apparatus for performing this process is also described.

11 Claims, 3 Drawing Sheets

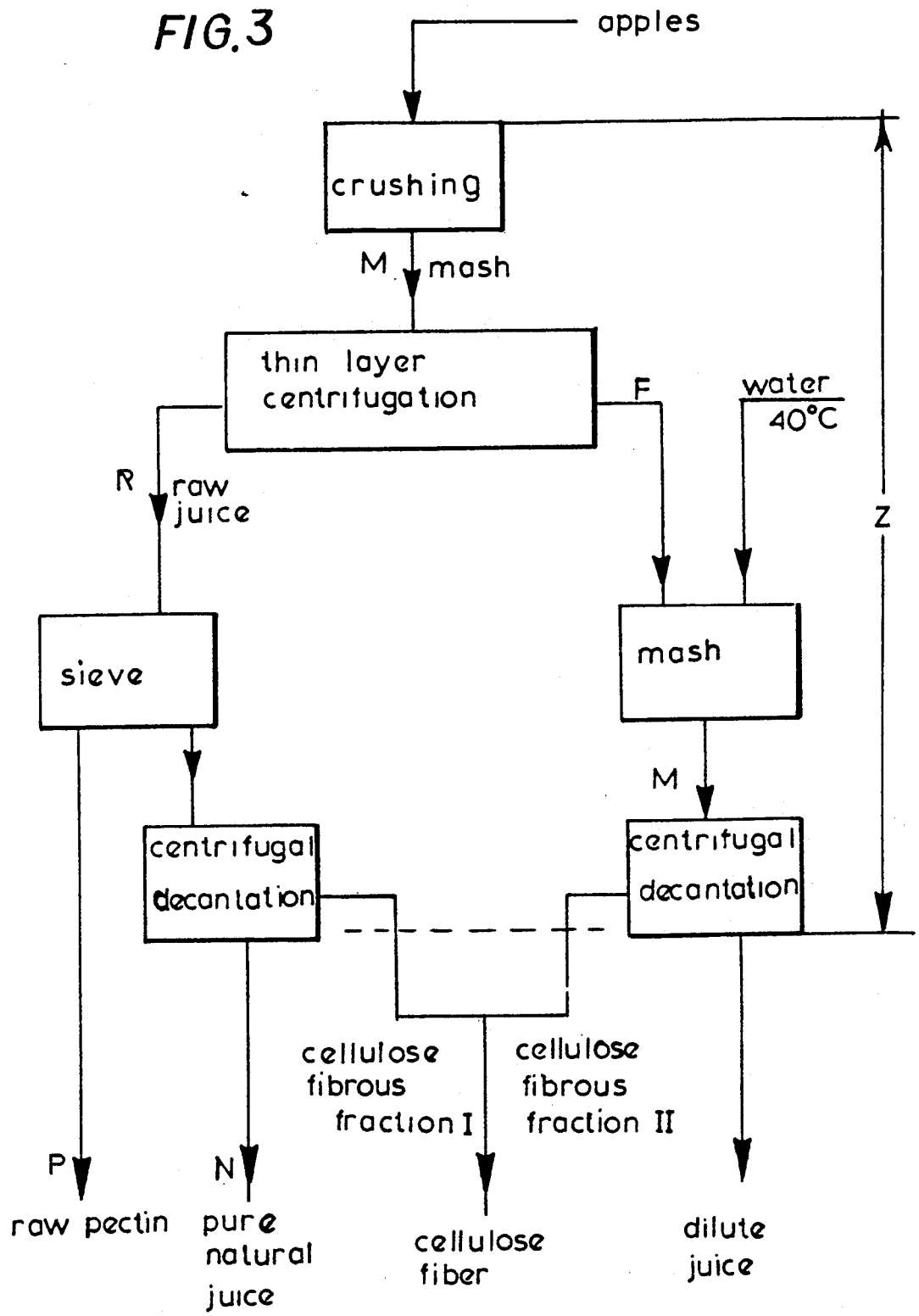

APPARATUS FOR THE RECOVERY OF FOOD JUICES

FIELD OF THE INVENTION

Our present invention relates to an apparatus for obtaining juice from produce and, more particularly, for obtaining juice from a solid phase obtained from produce, such as fruit, vegetables or other field produce.

BACKGROUND OF THE INVENTION

Processes for separation of juice from a solid phase in a mash formed by crushing cells of produce are known. They are useful for obtaining fruit juices and juices from other produce such as berries, vegetables or other field produce, especially for obtaining apple juice from apple mash.

In a known process for making apple juice, apple mash is separated mechanically from crushed apples in a press into a liquid phase and a solid phase. Because of the comparatively long time required for the pressing step the pectin contained in the liquid phase reacts with the other fluid components and oxygen and must again be separated by enzymatic or other biochemical treatment methods in subsequent extraction steps.

Apart from the increased process expense, a product obtained using an enzymatic or biochemical subsequent treatment can no longer be spoken of as being completely "natural".

OBJECT OF THE INVENTION

It is an object of our invention to provide a process for making juice from produce, in which the fluid extraction and the pectin separation can be effected continuously without enzymatic or biochemical process steps.

SUMMARY OF THE INVENTION

This object and others which will become more readily apparent hereinafter is attained in accordance with our invention in a process and apparatus for obtaining a useful juice from produce, especially for obtaining juice from fruits, vegetables and other field produce. The invention is especially applicable to the production of apple juice.

According to our invention the process comprises the steps of:

(a) continuously centrifuging the mash to form the solid phase and a liquid phase;

(b) mechanically separating the liquid phase from foam combined with pectin components floating on it; and (c) completing the steps of centrifugation and separation before beginning of a reaction of the pectin components with oxygen. Indeed, the time period Z from the cellular crushing to form the a extending to the mechanical preparation in step (b) should be less than the time period to inception of the reaction of the pectin with oxygen.

The process for obtaining fruit juice or other fluids from a produce mash can also include the steps of degassing the fluid phase.

It can also include a step of separating a cellulose fiber fraction from the mesh phase separated from the pectin components by centrifugal decantation before the beginning of the reaction of the pectin components with the oxygen, i.e. within the time period Z as defined above.

The process can further advantageously comprise mashing the solid phase separated by the centrifuging with additional water and separating it into a thin juice and another cellulose fibrous fraction by centrifugal decantation before the reaction of the pectin components with oxygen begins, i.e. within the period Z.

The apparatus for obtaining juice from a solid phase in a mash obtained by cell crushing of produce, such as fruit, vegetables and other field produce, especially for making apple juice, by continuously centrifuging the mash to form a solid phase and a fluid phase and by mechanically separating the fluid phase from foam combined with pectin components floating on it before the inception of a reaction of pectin components with oxygen comprises a filtering centrifuge designed and constructed to perform a thin layer-centrifugation process with a conical sieve.

This centrifuge can be an enclosed centrifuge in a housing into which inert gas is introduced. Various inert gases including carbon dioxide can be used.

The apparatus also include a vibrating sieve for mechanical separation of the fluid phase and/or the foam floating on the fluid phase and/or raw juice.

The apparatus can have a conical sieve comprising a conical sieve screen and a base plate with a centrally mounted distributor cone tapered in a direction opposite from said conical sieve.

According to a feature of the invention the apparatus also has an inlet pipe for the mash opening in the vicinity of the base plate and having an annular toothed bordering flange at its open end positioned opposite and adjacent to a toothed ring portion of the base plate which is spaced from it. Positioned adjacent and interiorly to the conical sieve screen a guiding frustoconical member can be mounted spaced from the sieve screen. The guiding frustoconical member can have a plurality of openings in the vicinity of the base plate for introduction of gas in the space enclosed between the conical sieve and the guiding frustoconical member.

Means for feeding air through the openings of the guiding frustoconical member can be provided as well as means for feeding an inert gas, e.g. carbon dioxide, into the apparatus.

The apparatus can further comprise a plurality of guiding coil elements attached to an interior surface of the guiding frustoconical member facing the sieve screen. The guiding coil elements can be inclined in a direction opposite the rotation direction of the centrifuge.

At least one blocking ring bounding and reducing an annular gap between the conical sieve and the other guiding frustoconical member can be provided on the conically widened end of the guiding frustoconical member.

BRIEF DESCRIPTION OF THE DRAWING

The above and other objects, features and advantages of our invention will become more readily apparent from the following description, reference being made to the accompanying highly diagrammatic drawing in which:

FIG. 3 is a block diagram for the manufacturing process according to our invention as embodied in a process for making apple juice.

SPECIFIC DESCRIPTION

Figure 1:
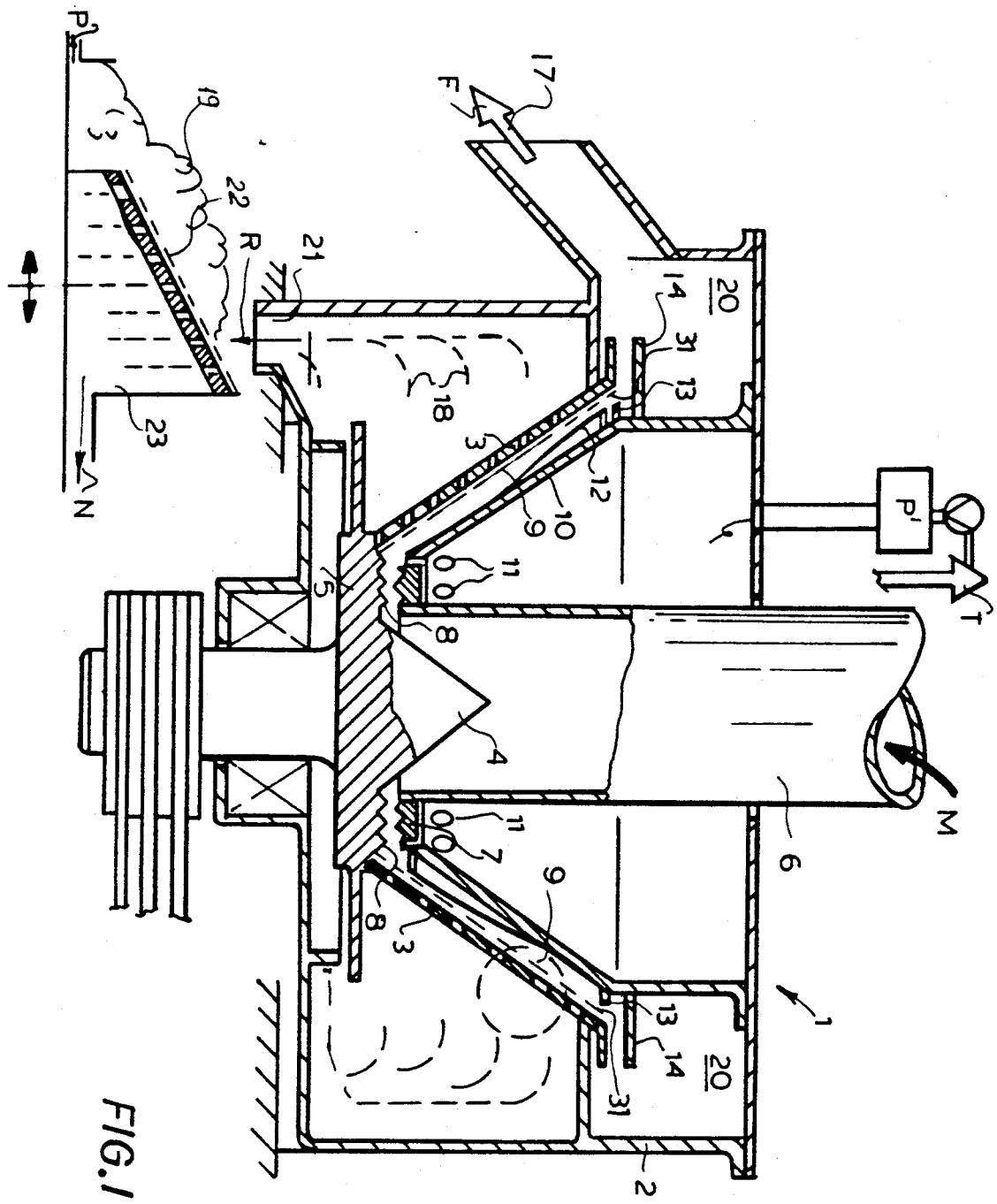
FIG. 1 is a cross sectional view through a centrifuge with filter means according to our invention with downstream vibrating screen.

FIG. 1 shows a centrifuge 1 with filter means having a centrifuge housing 2, in which a conical sieve 3 is mounted, whose frustoconically narrowed end is attached to a base plate 5 carrying a distributing cone 4 which is tapered in the opposite direction from the conical sieve 3.

An inlet pipe 6 for the mash M supported in the centrifuge housing 2, on whose open end an annular toothed bordering flange 7 is attached, opens in the vicinity of the base plate 5.

The toothed bordering flange 7 is positioned opposite a toothed ring portion 8 spaced from it on the base plate 5.

The sieve screen 9 of the conical sieve 3 is associated with and positioned opposite a guiding frustoconical member 10 mounted in the centrifuge housing 2, which has a plurality of openings 11 in the vicinity of the base plate 5 for feeding air and/or inert gas into an enclosed space between the sieve surface 9 and the guiding frustoconical member 10.

Guiding coil elements 12 extending around the frustoconical member 10 are attached to its surfaces facing the sieve screen surfaces 9 and are inclined opposite to the direction of rotation of the conical sieve 3. On the conically widened end of the guiding frustoconical member 10 two blocking rings 13 and 14 reduce the annular gap 31 between the conical sieve 3 and the guiding frustoconical member 10.

Figure 2:
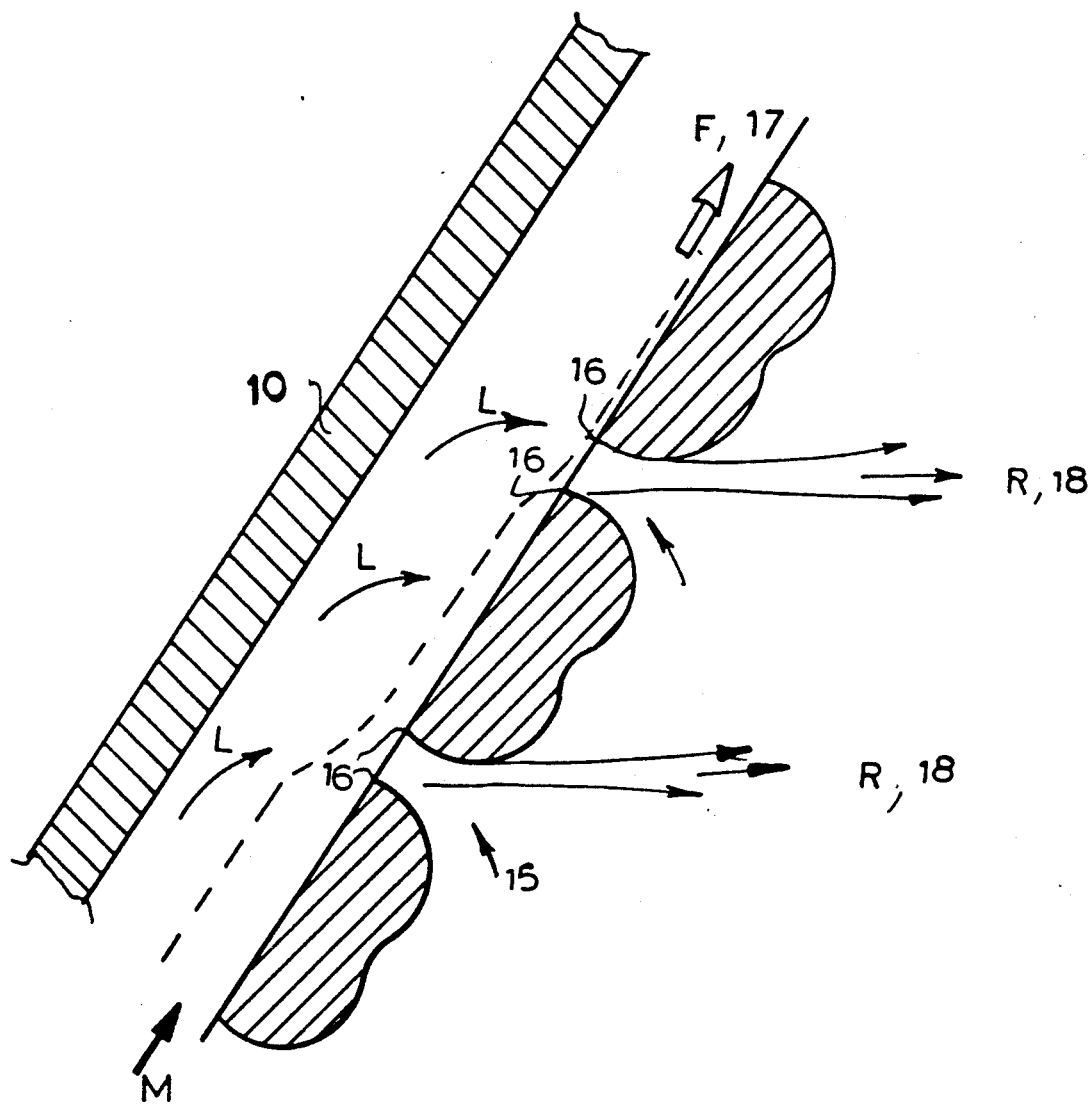
FIG. 2 is a diagrammatic detailed cross sectional view through a portion of the centrifuge showing the sieve screen surface.

The detailed view of FIG. 2 of the sieve screen surface with the sieve openings 15 shows a separation or splitting of the solid phase 17 and/or the fibrous material F and a fluid phase 18 and/or raw juice R. A decompression (Bunsen Effect) acting through the sieve screen openings 15 because of the flow of raw juice R in combination with a shearing process caused by friction causes a turbulence in the raw juice flow which leads to an intimate association of the gas and pectin components contained in the fluid phase 18 and forms a foam 19.

The solid phase 17 and/or the fibrous material F centrifuged to the conically widened ends of the conical sieve 3 reaches the solid collection chamber 20 and is taken from there for further processing, the fluid phase 18 and/or the raw juice R centrifuged through the sieve openings 15 is conducted by the drain pipe 21 to the inclined sieve surfaces 22 of a vibrating sieve 23, on which the pectin components combined in the foam 19 are separated mechanically from the raw juice R.

In operation of the centrifuge 1 with filter means to make apple juice the mash M is fed from the apples by an inlet pipe 6 and is distributed uniformly on the surface of the sieve screen 9 of the conical sieve 2 by the distributing cone 4, the toothed bordering flange 7 and the toothed ring portion 8. A separation of the mash M into the solid phase 17 and/or the fibrous components F and the liquid phase 18 and/or the raw juice R from which the pectin combined in the foam is separated on the surface of the sieve screen 9 is effectives during the centrifugation process.

The centrifuge 1 is operated in a thin layer-centrifugation process, which creates a comparatively thin layer of mash with a correspondingly reduced dwell time on the sieve screen surface. The angle of the conical sieve 3 and the rotation speed of the centrifuge 1 with filter means are chosen so that the separation of the fluid phase from the mash and the separation of the foam 19 containing the pectin components floating on the fluid phase can be effected in the time interval before the reaction of the pectins with oxygen.

Tests have shown that in the centrifuge process air quantities sufficient to bind the pectins contained in the fluid phase 18 and/or in the raw juice or fluid R are carried in the raw fluid R, however it is advantageous to feed a metered amount of air L to the thin layer formed on the sieve screen surfaces. The guiding frustoconical member 10, through whose openings 11 located in the bottom region, air can be conducted to the thin layer in the desired quantities can serve for this purpose. In the same way a metered inflow of an inert gas, especially carbon dioxide, can be effected through this guiding frustoconical member 10 and its openings 11, when it is desired to delay the reaction time with oxygen.

Basically the centrifugation process can be effected also completely in an inert gas atmosphere which can prevent reaction of material sitting in the dead space of the centrifuge 1 with filter means with oxygen and can impair the product quality by germination. Furthermore the filter centrifuge using inert gas is more easily cleaned.

The thin layer located on the surface of the sieve screen 9 can be controlled in its layer thickness with the guiding frustoconical member 10 and the guiding coil elements 12 attached to it. They also prevent too rapid an escape of air L and/or inert gas guided over the thin layer through the annular gap formed by the conical sieve 2 and the guiding frustoconical member 10. The delivery or discharge of the solid phase is controllable by two blocking rings 13 and 14 located on the conically widened ends of the guiding frustoconical member 10.

According to the flow chart in FIG. 3 to manufacture apple juice the apples are processed after crushing them to a mash M in the previously described thin layer-centrifugation process in which the fibrous material F and the raw apple juice R are obtained.

During the centrifugation process the pectin contained in the raw apple juice R separates by combining with the air to form a floating foam, which is subsequently separated mechanically in a downstream vibrating sieve screen 23. The process of centrifugation and the mechanical separation of the pectin runs continuously and before initiation of the reaction of the pectins with oxygen in about 3 to 5 seconds (within the aforementioned period Z). After the separation of a residual cellulose fiber fraction I from the natural juice or liquid in a first centrifugal decanter and/or in a first solid jacket-sedimentation centrifuge a pure natural juice N is obtained as an end product (sugar content about 12%).

The fibrous material F obtained in the solid jacket-sedimentation centrifuge is freshly mashed and mixed with water at about advantageously 40° C. and is separated into cellulose fiber fraction II and a dilute juice (sugar content about 5%) in a second solid jacket-sedimentation centrifuge.

The natural juice N obtained from the thin-layer centrifugation process and the sieve and the fibrous material F mashed up with additional water are depectinized continuously. Since slight residual pectin components in the natural apple juice and in the mashed up fibrous material can lead to a gelling out which can impair the separation of the fluid components from the fibrous components, the process of separation of the cellulose fiber fraction I and the cellulose fiber fraction II in first and second centrifugal decantation must be concluded in the time interval Z before start of a reaction of the residual pectins with oxygen.

The time interval Z must be chosen according to the reaction time of the pectins with oxygen, which is about 20 seconds. This reaction time can be prolonged by use of a suitable inert gas.

The end products obtained according to the manufacturing process shown in the block diagram (FIG. 3) include a pure dilute juice, pure pectins, pure natural juice and cellulose fibers. The juice can be referred to as being completely of natural origin because it is obtained only by mechanical separation of the pectins and without chemical, biological or biochemical intervention. By contrast, in the process used up to now the pectins are removed only by enzymatic or biochemical treatment of the raw juice, so that the apple juice cannot be characterized as being of natural origin and the pectin is obtained in a chemically combined form.

Means for feeding an inert gas or air to the centrifuge can be provided. Conventional means including a pump P', a metering valve V and a connected high pressure tank T are shown in FIG. 1.

We claim:

1. An apparatus for obtaining juice from a solid phase in a mash obtained by cell crushing of field produce by continuously centrifuging said mash to form said solid phase and a liquid phase and by mechanically separating said liquid phase from foam combined with pectin components floating on said liquid phase before the beginning of a reaction of said pectin components with oxygen, said apparatus comprising:
a centrifuge provided with;
a conical sieve having a conical sieve screen, and
a base plate with a centrally mounted distributor cone tapered in a direction opposite from said conical sieve for separating a solid phase from a liquid phase formed upon crushing of produce;
a guiding frustoconical member mounted spaced from said sieve screen of said conical sieve and having a plurality of guiding coil elements attached to an interior surface of said guiding member facing said sieve screen and inclined in a direction opposite a rotation direction of said centrifuge; and
a vibrating sieve operatively connected with said conical sieve for mechanical separation of a thin layer of said liquid phase and a foam formed with pectin components floating on said liquid phase upon screening thereof by said conical sieve.

2. The apparatus defined in claim 1, further comprising an inlet pipe for said mash opening in the vicinity of said base plate having an annular toothed bordering flange positioned opposite and adjacent to a toothed ring portion of said base plate spaced therefrom.

3. The apparatus defined in claim 1 wherein said guiding frustoconical member has a plurality of openings in the vicinity of said base plate for introduction of gas in a space enclosed between said conical sieve and said guiding frustoconical member.

4. The apparatus defined in claim 3, further comprising means for feeding air through said openings.

5. The apparatus defined in claim 3, further comprising means for feeding inert gas through said openings.

6. The apparatus defined in claim 5 wherein said inert gas comprises carbon dioxide.

7. The apparatus defined in claim 1 wherein said guiding coil elements are inclined in a direction opposite the rotation direction of said centrifuge.

8. The apparatus defined in claim 1, further comprising at least one blocking ring bounding and reducing a annular gap between said conical sieve and said guiding frustoconical member on a conically widened end of said guiding frustoconical member.

9. The apparatus defined in claim 1 in which said centrifuge comprises an enclosed centrifuge in which inert gas is introduced.

10. An apparatus for obtaining juice from a solid phase in a mash obtained by cell crushing of fruit, by continuously centrifuging said mash to form said solid phase and a liquid phase and by mechanically separating said liquid phase from foam combined with pectin components floating on said fluid phase before beginning of a reaction of said pectin components with oxygen, said apparatus comprising:
a centrifuge formed with a conical sieve having a conical sieve screen and a base plate with a centrally mounted distributor cone tapered in a direction opposite from said conical sieve;
a vibrating sieve for mechanical separation of said liquid phase and said foam with said pectin components floating on said liquid phase;
an inlet pipe for said mash opening in the vicinity of said base plate having an annular toothed bordering flange positioned opposite and adjacent to a toothed ring portion of said base plate spaced therefrom;
a guiding frustoconical member mounted spaced from said sieve screen of said conical sieve and having a plurality of openings in the vicinity of said base plate for introduction of gas in a space enclosed between said conical sieve and said guiding frustoconical member;
means for feeding air through said openings of said guiding frustoconical member;
a plurality of guiding coil elements attached to an interior surface of said other frustoconical member facing said sieve screen and inclined in a direction opposite the rotation direction of said centrifuge; and
at least one blocking ring bounding and reducing an annular gap between said conical sieve and said guiding frustoconical member on a conically widened end of said guiding frustoconical member.

11. An apparatus for obtaining juice from a solid phase in a mash obtained by cell crushing of field produce by continuously centrifuging said mash to form said solid phase and a liquid phase and by mechanically separating said liquid phase from foam combined with pectin components floating on said fluid phase before beginning of a reaction of said pectin components with oxygen, said apparatus comprising:
a rotatable centrifuge provided with a conical sieve having a conical sieve screen and a base plate with a centrally mounted distributor cone tapered in a direction opposite from said conical sieve;
a guiding frustoconical member mounted spaced from said sieve screen of said conical sieve and having a plurality of guiding coil elements attached to an interior surface of said guiding member facing said sieve screen and inclined in a direction opposite a rotation direction of said centrifuge.

* * * * *